United States Patent
Nielsen et al.

(10) Patent No.: US 11,204,018 B2
(45) Date of Patent: Dec. 21, 2021

(54) CONTROL SYSTEM FOR A FLOATING WIND TURBINE STRUCTURE

(71) Applicant: HYWIND AS, Stavanger (NO)

(72) Inventors: Finn Gunnar Nielsen, Bønes (NO); Bjørn Skaare, Trondheim (NO)

(73) Assignee: HYWIND AS, Stavanger (NO)

( * ) Notice: Subject to any disclaimer, the term of this patent is extended or adjusted under 35 U.S.C. 154(b) by 0 days.

(21) Appl. No.: 16/463,599

(22) PCT Filed: Nov. 29, 2016

(86) PCT No.: PCT/NO2016/050245
§ 371 (c)(1),
(2) Date: May 23, 2019

(87) PCT Pub. No.: WO2018/101833
PCT Pub. Date: Jun. 7, 2018

(65) Prior Publication Data
US 2019/0277255 A1    Sep. 12, 2019

(51) Int. Cl.
*F03D 7/02*    (2006.01)
*B63B 35/44*    (2006.01)
(Continued)

(52) U.S. Cl.
CPC ............ *F03D 7/0292* (2013.01); *B63B 21/50* (2013.01); *B63B 35/44* (2013.01); *B63B 39/03* (2013.01);
(Continued)

(58) Field of Classification Search
CPC ........ F03D 7/0292; F03D 9/30; F03D 7/0224; F03D 7/044; G05D 1/0875; B63B 21/50;
(Continued)

(56) References Cited

U.S. PATENT DOCUMENTS 8,053,916 B2 * 11/2011 Edwards ............... F03B 13/142
290/44
8,129,852 B2 * 3/2012 Edwards ............... B63B 39/02
290/44
(Continued)

FOREIGN PATENT DOCUMENTS

CN    103264752    8/2013
CN    105089935    11/2015
(Continued)

OTHER PUBLICATIONS

Extended European Search Report dated May 28, 2020 in corresponding European Patent Application No. 16922973.9.
(Continued)

*Primary Examiner* — Charles R Kasenge
(74) *Attorney, Agent, or Firm* — Wenderoth, Lind & Ponack, L.L.P.

(57) ABSTRACT

A method of controlling a turbine of a floating wind turbine structure to reduce fatigue of moorings of the floating wind turbine structure includes curtailing the turbine based on a pitching motion of the floating wind turbine structure and on a wind direction at the floating wind turbine structure relative to an orientation of the moorings of the floating wind turbine structure. Optionally, the curtailment may be further based on a degree of displacement of the floating wind turbine structure from a reference location.

24 Claims, 5 Drawing Sheets

(51) Int. Cl.
  *F03D 9/30* (2016.01)
  *B63B 39/03* (2006.01)
  *G05D 1/08* (2006.01)
  *B63B 21/50* (2006.01)
  *F03D 7/04* (2006.01)

(52) U.S. Cl.
  CPC ............. *F03D 9/30* (2016.05); *G05D 1/0875* (2013.01); *B63B 2035/446* (2013.01); *F03D 7/0224* (2013.01); *F03D 7/044* (2013.01); *F05B 2240/93* (2013.01); *Y02E 10/72* (2013.01)

(58) Field of Classification Search
  CPC ... B63B 35/44; B63B 39/03; B63B 2035/446; Y02E 10/723; F05B 2240/93
  See application file for complete search history.

(56) References Cited

U.S. PATENT DOCUMENTS

| | | | | |
|---|---|---|---|---|
| 8,471,396 | B2* | 6/2013 | Roddier | F03D 17/00 290/44 |
| 8,692,401 | B2* | 4/2014 | Roddier | B63B 39/03 290/44 |
| 9,139,266 | B2* | 9/2015 | Roddier | F03D 7/0204 |
| 9,169,013 | B2 | 10/2015 | Jensen et al. | |
| 9,446,822 | B2* | 9/2016 | Roddier | F03D 13/10 |
| 9,777,711 | B2* | 10/2017 | Rossetti | B63B 21/50 |
| 9,964,097 | B2* | 5/2018 | Dagher | B63B 39/03 |
| 2010/0003134 | A1* | 1/2010 | Edwards | F03D 13/25 416/1 |
| 2010/0025996 | A1* | 2/2010 | Edwards | F03B 13/00 290/44 |
| 2010/0133827 | A1 | 6/2010 | Huang et al. | |
| 2011/0037264 | A1* | 2/2011 | Roddier | F03D 9/25 290/44 |
| 2011/0140426 | A1 | 6/2011 | Garcia Lopez et al. | |
| 2011/0316277 | A1 | 12/2011 | Skaare et al. | |
| 2013/0236309 | A1* | 9/2013 | Rossetti | F03D 7/0296 416/1 |
| 2013/0276687 | A1* | 10/2013 | Roddier | B63B 1/107 114/121 |
| 2014/0017083 | A1* | 1/2014 | Pineda Amo | F03D 9/12 416/37 |
| 2014/0196654 | A1* | 7/2014 | Roddier | F03D 9/25 114/265 |
| 2014/0219797 | A1* | 8/2014 | Friedrich | F03D 13/22 416/1 |
| 2014/0339828 | A1* | 11/2014 | Peiffer | B63B 39/03 290/44 |
| 2015/0104259 | A1* | 4/2015 | Johnson | B63B 21/502 405/205 |
| 2015/0308068 | A1 | 10/2015 | Molins Borrell et al. | |
| 2015/0354532 | A1* | 12/2015 | Nielsen | F03D 13/25 416/9 |
| 2015/0367918 | A1* | 12/2015 | Roddier | F03D 13/10 290/44 |
| 2016/0230746 | A1* | 8/2016 | Dagher | F03D 7/043 |
| 2017/0037832 | A1* | 2/2017 | Friedrich | B63B 21/50 |
| 2018/0111665 | A1* | 4/2018 | Tsao | F03B 17/06 |

FOREIGN PATENT DOCUMENTS

| | | |
|---|---|---|
| JP | 2014-218958 | 11/2014 |
| JP | 2016-94929 | 5/2016 |
| KR | 10-1616427 | 4/2016 |
| WO | 2015/158348 | 10/2015 |

OTHER PUBLICATIONS

International Search Report and Written Opinion of the International Searching Authority dated Jun. 28, 2017 in International (PCT) Application No. PCT/NO2016/050245.

Notification of Reasons for Rejection dated Nov. 4, 2020 in Japanese Patent Application No. 2019-528643.

Office Action dated Jul. 16, 2020 in corresponding Chinese Patent Application No. 201680091223.0 with English-language translation.

* cited by examiner

CONTROL SYSTEM FOR A FLOATING WIND TURBINE STRUCTURE

BACKGROUND OF THE INVENTION

1. Field of the Invention

The present invention relates to control system for a floating wind turbine structure.

2. Description of the Related Art

A wind turbine structure is usually formed of a support structure comprising an elongate tower, with a nacelle and a rotor attached to the upper end of the support structure. The generator and its associated electronics are usually located in the nacelle.

Fixed-base wind turbines that are fixed either to the land or the sea bed are well-established. However, recently there has been a desire to develop floating wind turbines and various structures have been proposed. One example is a wind turbine structure where a conventional wind turbine structure is mounted on a floating foundation such as a buoyant platform or raft-like structure. Another proposal is a "spar buoy" type structure. Such a structure is formed of an elongate buoyant support structure with a rotor mounted on the top. The support structure could be a unitary structure or the foundation part could be formed as an elongate sub-structure with a standard tower mounted thereon.

When a floating wind turbine structure is acted on by forces, such as those caused by changes in wind speed or currents, the whole structure moves about in the water. These motions may have a large amplitude but relatively low frequency, i.e. they are large slow motions—the motions are low frequency in the sense that they are much lower than the rotational frequency of the turbine itself.

The motions experienced by a wind turbine structure are described as "heave" which is linear vertical (up/down) motion, "sway" which is linear lateral (side-to-side) motion, "surge" which is linear longitudinal (front/back) motion, "roll" which is rotation of the body about its horizontal (front/back) axis, "pitch" which is rotation of the body about its transverse (side-to-side) axis and "yaw" which is rotation of the body about its vertical axis.

Floating wind turbine structures are typically moored to the sea bed via one or more mooring lines with anchors so as to restrain these motions. Conventional mooring system designs for floating wind turbines are based on simulations of the fatigue limit state (FLS) and the ultimate limit state (ULS) load cases formulated on a met-ocean design basis, and using corresponding safety factors from the relevant standards to account for uncertainties. However, the safety factors take into account uncertainties related to the environmental loading from the met-ocean design basis and so the moorings are often significantly overdesigned for the actual operating situations.

It has been proposed in some installations to make use of thrusters to counteract movement of the floating foundation of the wind turbine structure, and hence reduce the loading on the moorings. However, a need still exists for alternative or improved means of reducing the uncertainty in the mooring loading.

SUMMARY OF THE INVENTION

The present invention provides a method of controlling a turbine of a floating wind turbine structure, preferably to reduce fatigue of its moorings, comprising curtailing the turbine based on a motion of the wind turbine structure, preferably a pitch motion, and a wind direction at the wind turbine structure relative to the orientation of moorings of the wind turbine structure.

Oscillating motion of the wind turbine structure and the direction of the wind have been identified as two factors having a significant effect on the fatigue lifetime of the mooring structure of a wind turbine structure. Pitch motions occur when there is oscillating loading on the turbine, for example due to wind speed variations and/or wave loading, which in turn cause oscillating loading in the mooring. Where these motions occur in conjunction with already heavy loading on the mooring, this can significantly increase the fatigue in the moorings. The wind direction affects how the mooring structure is loaded. For example, an unfavorable wind direction may put most of the load onto a single mooring line, whereas a more favorable wind direction may distribute it between two mooring lines.

By monitoring motion of the wind turbine structure (particularly pitching motions, which are indicative of wind loading and also strongly related to the wave loading) and the direction of the wind during operation, and curtailing the wind turbine (hence decreasing the aerodynamic thrust force on the wind turbine structure) when they are unfavorable, it is possible to significantly reduce the loading and fatigue in the moorings of the wind turbine structure, thereby increasing its operational lifetime.

Furthermore, by providing this form of control, it may be possible to use lower safety factors during the design stage of the wind turbine structure because the turbine will be able to reduce power output (and hence loading) during unfavorable conditions meaning that the mooring structure does not need to be designed to take the maximum loading at maximum power output in the worst conditions. This may represent a significant cost benefit in building the wind turbine structure.

The wind turbine structure preferably comprises a floating foundation, a tower extending from the floating foundation and a turbine mounted to the tower. The turbine preferably comprises a rotor and a generator, typically within a nacelle. The wind turbine structure may be provided with mooring, such as catenary moorings, extending from the wind turbine structure to the sea bed to maintain the position of the wind turbine structure.

In various embodiments, the (pitch) motion of the wind turbine structure and/or the wind direction may be measured directly, for example using instruments located on or in the vicinity of the floating wind turbine, or may be estimated, for example based on other measured properties of the wind turbine structure or its environment.

As used herein, the term "curtailing" is intended to refer to reducing the power output of the wind turbine compared to its normal power output for the same wind speed. Hence, curtailing the turbine reduces the wind thrust loading applied to the wind turbine structure relative to non-curtailed operation. Curtailment methods typically include applying a rotor blade pitch offset (to reduce aerodynamic lift) or increasing the resistance of a generator (to apply a greater resistive torque to the rotor).

The curtailment is preferably based on the variability of the (pitch) motion. That is to say, some measure of how much the (pitch) motion is varying at the time. For example, the curtailment may be based on the standard deviation of the pitch motion over a predetermined period of time. Preferably the period of time is at least 1 minute and preferably less than 1 hour. More preferably the period of time is between 5 and 15 minutes.

The curtailment preferably comprises at least a (pitch-) motion-based component and/or a wind-direction-based component.

Preferably the (pitch-)motion-based component and/or the wind-direction-based component may each be constant, e.g. zero, when the (pitch) motion measure is below a threshold level of variability. This is because it is the effect of varying motion that leads to fatigue in the system, and the largest motions lead to the largest fatigue. Large static forces do not cause fatigue damage and so require less curtailment. It should be appreciated, however, that curtailments other than the (pitch-)motion-based curtailment and/or the wind-direction-based curtailment may still be applied below the threshold level of variability. For example, curtailment for other reasons, such as due to wind speeds above rated speed or to counter current-based drift, may be applied even below the threshold level of pitch motion.

The (pitch-)motion-based component preferably increases with a measure of the (pitch) motion. More specifically, the (pitch-)motion-based component preferably increases with the (pitch-) motion variability (e.g. the standard deviation of the (pitch) motion over a predetermined time period). The increase may be linear or non-linear.

The wind-direction-based component preferably increases at least partially linearly with wind direction relative to the orientation of the moorings. That is to say, for at least certain values of wind direction, the wind-direction-based component increases linearly. However, in other embodiments, the wind-direction-based component may vary non-linearly with wind direction relative to the orientation of the moorings.

The wind-direction-based component preferably has a maximum value when the wind approaches the wind turbine structure directly over one of the moorings (i.e. the wind is blowing towards the turbine in a direction parallel to the direction of the mooring from its anchor end towards the wind turbine structure) and a minimum value when the wind approaches the wind turbine directly between two adjacent moorings. When the wind approaches the wind turbine structure directly over one of the moorings, that mooring will carry the majority of the wind loading. Preferably the wind-direction-based component has a maximum value for each wind direction where the wind approaches directly over one of the moorings and a minimum value for each wind direction when the wind approaches directly between two of the moorings. The wind-direction-based component may vary linearly with wind direction between the maximum and minimum values. However, in some embodiments the variation may be non-linear.

This arrangement accounts for the fact that when the wind approaches over a single mooring, a substantial fraction of the loading will be applied to that mooring, whereas when it approaches between two moorings, the loading on each mooring will be lower because the wind load will be distributed between the two moorings. As such, the turbine should be curtailed when the wind is loading a single mooring as the loads in the mooring are likely to be significantly higher. The curtailment may be implemented by applying a blade pitch offset to one or more blades of the turbine so as to reduce an aerodynamic rotor thrust force on the floating wind turbine structure. The pitch offset is preferably relative to the direction the blade would normally operate at to achieve the desired power output of the turbine (e.g. maximum power output below rated wind speeds, or rated power output above rated wind speeds). The blade pitch offset preferably flattens the blade with respect to the relative airflow, such that power extraction is reduced.

The blade pitch offset may be determined at least in part based on the following equation:

$$\beta_{offset}(\alpha_W, \eta_{STD}) = \beta_{wind\_offset}(\alpha_W) + \beta_{pitch\_offset}(\eta_{STD})$$

where $\beta_{offset}$ is a blade pitch offset, $\alpha_W$ is the wind direction, $\eta_{STD}$ is either the standard deviation of the pitch motion over a predetermined period of time or a value derived therefrom, $\beta_{pitch\_offset}$ is an offset based on $\eta STD$ and $\beta_{wind\_offset}$ is an offset based on wind direction.

That is to say, the blade offset includes a component that varies with wind direction and a component that varies with the standard deviation of the pitch motion. It should be appreciated that other blade pitch modifications may also be made in addition to this component. For example, blade pitch modifications may also be applied to restrict power output to the rated power output when above rated wind speed.

The offset based on wind direction may be determined at least in part based on the following equation:

$$\beta_{wind\_offset}(\alpha_W) = \beta_2 \left| 1 - 2\frac{(\alpha_W + \alpha_0)\bmod \theta}{\theta} \right|,$$

where $\beta_2$ is a constant, $\alpha_0$ is a constant, and $\theta$ is the angular distance between adjacent mooring lines.

This equation outputs a zig-zag function that linearly increases and decreases with wind direction relative to the orientation of the moorings. The $\alpha_0$ constant is preferably selected so that the maximum value of the equation occurs when the wind approaches directly over a mooring line.

The offset based on pitch motion may be determined at least in part based on the following equation:

$$\beta_{pitch\_offset}(\eta_{STD}) = \beta_1 \frac{\eta_{STD} - \eta_{STD\_0}}{\eta_{STD\_0}},$$

where $\eta_{STD\_0}$ is a constant, $\beta_1$ is a constant.

Thus, the blade offset may vary linearly with the standard deviation or a value derived therefrom. The derived value may, for example, be a projection of the standard deviation of the pitch motion over a predetermined period of time onto the most heavily loaded mooring line.

The value of $\beta_{offset}(\alpha_W, \eta_{STD})$ is preferably set to zero for $\eta_{STD} < \eta_{STD\_0}$. That is to say, below the value $\eta_{STD\_0}$, this component does not apply a blade offset. As discussed above, small pitch oscillations have been found to cause relatively low levels of fatigue damage in the moorings and so it is not necessary to reduce power output to account for these.

As an alternative to applying a blade pitch modification, the curtailment could instead be achieved by increasing a resistive torque applied by a generator of the turbine, i.e. so as to reduce an aerodynamic rotor thrust force of the turbine. This may be achieved mechanically, e.g. using gearing, or electrically, e.g. by increasing the current draw from the generator.

In addition to curtailing the wind turbine based on wind direction and pitch motion, the method may further comprise curtailing the wind turbine based on a position of the wind turbine structure relative to a reference position. This type of offset is typically indicative of high current forces. Subject to high current forces, combined with high wind loading, the moorings are subject to increased fatigue loading and also risk being brought closer to their tensile failure load point. Thus, detection of large positional offsets is also a useful indicator that the rotor thrust loading applied to the turbine should be reduced (i.e. by curtailing the wind turbine) to extend the lifetime of the moorings.

The reference position is preferably the position of the wind turbine structure when no external forces are acting to the wind turbine structure, i.e. zero current loading and zero wind loading.

The position of the wind turbine structure may be determined using a satellite-based positioning system, such as the Navstar global positioning system (GPS), or from the mean tension in the mooring lines. The reference location for the wind turbine structure is preferably in a floating foundation of the wind turbine structure, and may be at the fairlead level of the wind turbine structure.

The curtailment based on the position of the wind turbine structure may be based on a frequency-filtered position of the wind turbine, the frequency-filtered position preferably having been low-pass filtered. For example, the value may be low-pass filtered to remove components at higher frequencies. The low-pass filter may attenuate frequencies having oscillatory periods below at least 1 minute, preferably below at least 5 minutes, and most preferably below at least 10 minutes. This is so as to minimize fluctuation in the curtailment due to wave loading or the like. Instead, this restricts the loading to current-based loads, which occur at much lower frequencies.

The curtailment based on the position of the wind turbine may comprise a position-based component. As discussed above, this may be combined with the curtailment based on (pitch) motion of the wind turbine and wind direction relative to the orientation of the moorings of the wind turbine. That is to say, the curtailment may include a (pitch-)motion-based component, a wind-direction-based component and a position-based component.

The position-based component may be applied only when the position of the turbine is greater than a predetermined threshold distance from the reference position. The threshold distance may be variable depending on the direction of the displacement/offset from the reference position. For example, the allowable displacement/offset may be greater when the load does not pull directly on any of the moorings because part of the displacement/offset will then be caused by rotation of the moorings, as opposed to due to strain of the moorings.

The position-based component preferably comprises at least a proportional component that is proportional to the distance of the turbine from the reference position. More specifically, the proportional component may be proportional to the distance of the turbine beyond the threshold distance or a value derived from the distance of the turbine beyond the threshold distance.

The position-based component preferably comprises at least an integral component that is proportional to the integral of the distance of the turbine beyond the threshold distance or a value derived from the distance of the turbine beyond the threshold distance. The use of integral control allows the blade offset to be dynamically increased until the turbine returns within an acceptable distance of the reference position.

In one or more embodiment, the value derived from the distance of the turbine beyond the threshold distance may be a frequency-filtered value. For example, the value may be low-pass filtered to remove components at higher frequencies. Thus, the control will primarily counter the effects of slow-moving positional changes, which are predominantly caused by current forces.

As mentioned above, in addition to curtailment for the purpose of reducing undesirable loads on the mooring structure, the method may further comprise curtailing the wind turbine so as to produce no more than a rated power output at wind speeds above a rated wind speed of the of the wind turbine. This type of control is typically found in all wind turbines, and would be expected to still be present in addition to the further curtailment techniques discussed above.

Furthermore, the curtailment above rated wind speed preferably also comprises controlling the curtailment so as to suppress rigid body motions of the wind turbine structure in the pitch direction at about the resonant frequency of the wind turbine. Again, this type of control is typically found in all floating offshore wind turbine structures to counteract negative damping as negative damping may lead to large rigid body motions of the turbine structure in the pitch direction at about the resonant frequency. However, this type of control is required to prevent fatigue damage of the tower and not primarily the moorings.

The floating wind turbine structure preferably has a floating spar configuration. The moorings preferably comprise catenary mooring lines extending away from the floating wind turbine. There are preferably at least three catenary mooring lines and the mooring lines preferably extend away from the wind turbine in equally spaced directions.

It will be appreciated that, from a second aspect, the present invention also provides a floating wind turbine structure comprising a turbine and a controller configured to control turbine in accordance with the method of any preceding aspect.

The present invention also provides a computer program product comprising computer-readable instructions that, when executed, will cause a controller to control a turbine of a floating wind turbine structure in accordance with the method described above, as well as a tangible computer-readable medium storing such computer-readable instructions.

BRIEF DESCRIPTION OF THE DRAWINGS

Certain preferred embodiments of the present invention will now be described in greater detail by way of example only and with reference to the accompanying drawings, in which.

DETAILED DESCRIPTION OF THE INVENTION

Figure 1:
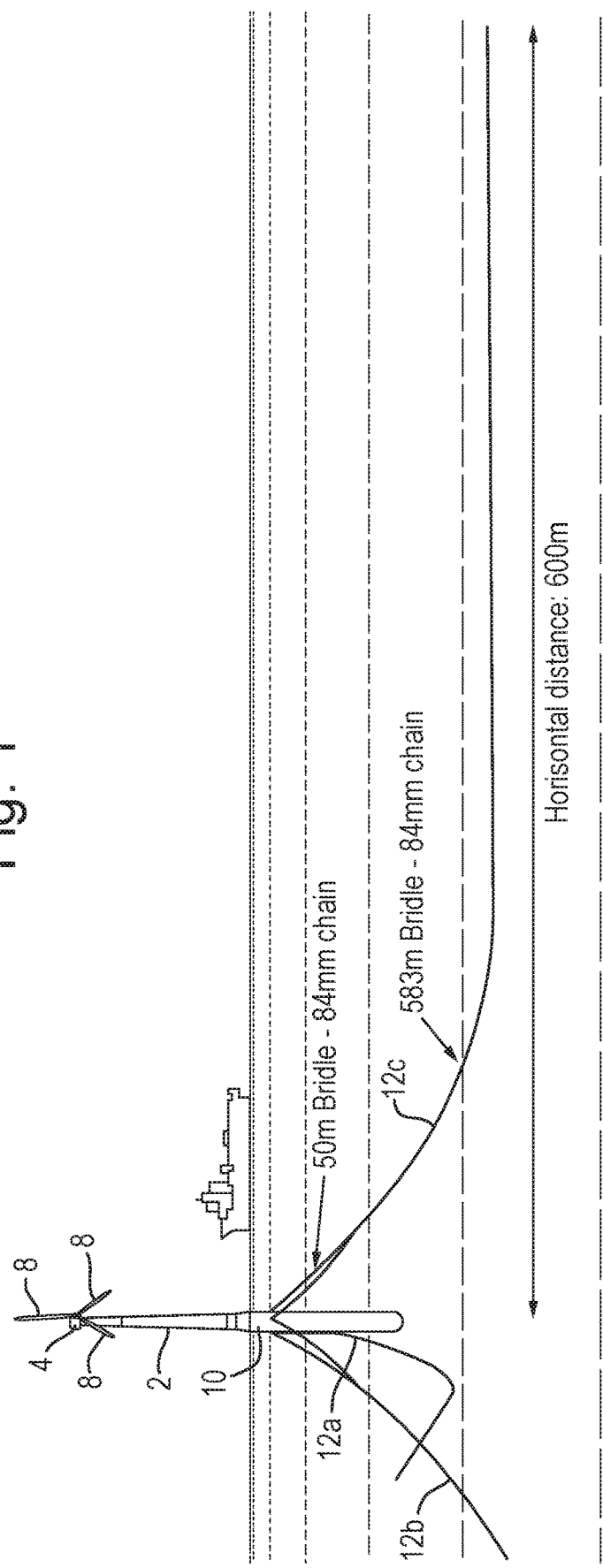
FIG. 1 is a side view of a wind turbine installation.
Figure 2:
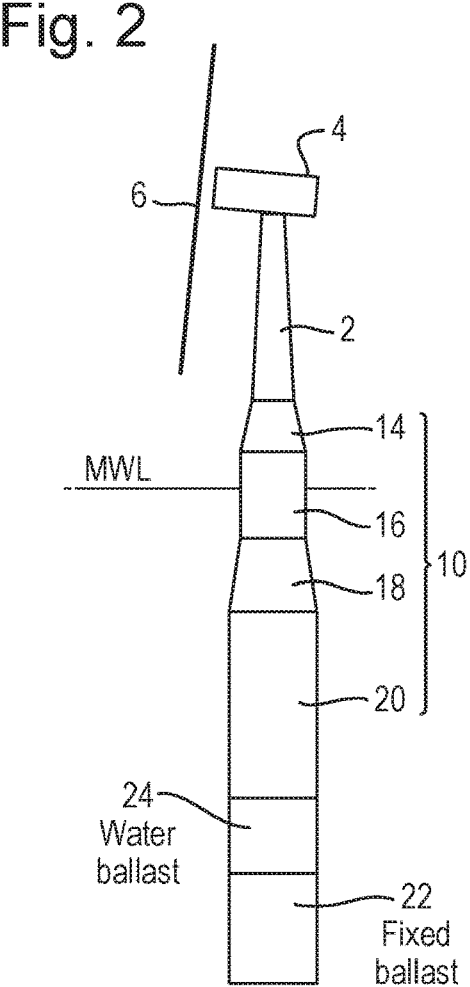
FIG. 2 is a side view showing details of the wind turbine of the installation.
Figure 3:
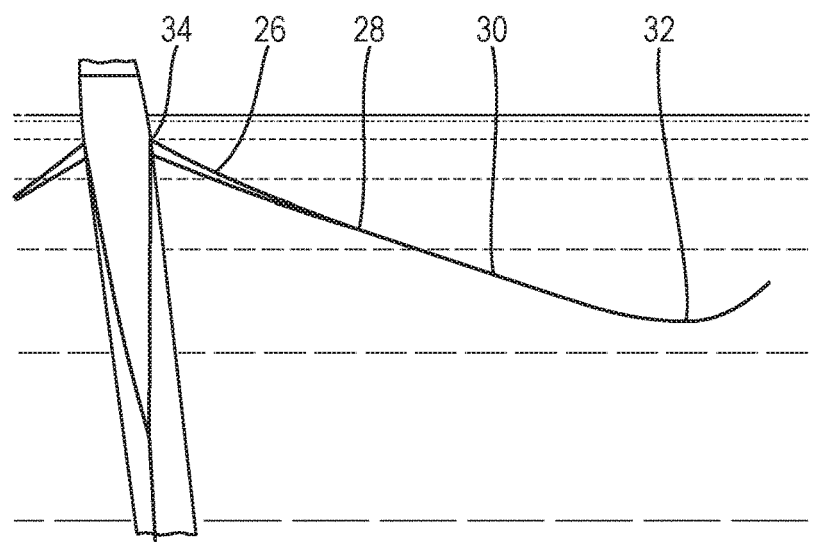
FIG. 3 is a perspective view of the wind turbine installation showing details of a mooring structure of the installation.

FIGS. 1 to 3 illustrate an offshore floating wind turbine installation. The floating wind turbine structure comprises a tower 2 which supports a nacelle 4. The nacelle 4 contains a generator and the associated electronics, and supports a rotor 6 comprising three blades 8. The tower 2 is supported on a floating spar-buoy structure 10 and the floating spar-buoy structure 10 is moored by a mooring system 12 comprising three anchor chains 12a, 12b, 12c.

The presently illustrated floating wind turbine has a 2.3 MW turbine, a nacelle height of about 65 m above the water line, a rotor diameter of about 82 m, and a diameter at the water line of about 6 m. However, the control techniques described can be employed also for larger turbines, such as in the 6-12 MW range. Typically, such floating wind turbines will be used in water depths of more than 100 m.

As shown in FIG. 2, the floating structure 10 is a classic spar-buoy shape, i.e. a tall, thin vertical cylindrical column. The structure 10 comprises an upper cone 14, a transition section 16 about which the mean water level (MWL) resides, a lower cone structure 18 and a substructure 20 which comprises ballasting 22, 24. A horizontal, circular plate (not shown) of larger diameter than the main column may be part of the bottom plate. The function of this plate is to tune the dynamic performance of the system by adding damping and hydrodynamic inertia.

The ballast comprises a fixed ballast 22 and a non-fixed ballast 24. The fixed ballast 22 is made up of a permanent ballast, such as high density concrete, and/or a bulk ballast, such as a high density aggregate. The non-fixed ballast 24 may be a water ballast that can be adjusted by pumping water into and out of a tank. The adjustable ballast 24 allows some of the dynamic properties of the structure 10 to be adjusted. For example the center of gravity and the tension in the mooring lines 12 can be changed, which is turn can change the resonant frequency of the floating structure. Typically the natural periods of the turbine will be tuned to be above 25 seconds so that resonant motions are not excited by the wave forces.

The mooring system 12 is used to hold the floating structure 10 in a desired location. As is typical in wind turbines, the generator on the top of the tower 2 is controllably rotatable so it can be turned face the incoming wind direction. The mooring system 12 is thus also designed to prevent rotation of the tower 2 and the floating structure 10 as the nacelle 4 mounted thereon rotates.

The mooring system 12 comprises three mooring lines 12a, 12b, 12c, and a detailed view of one of the mooring lines is shown in FIG. 3. Each mooring line 12a, 12b, 12c comprises a bridle section 26 which is connected by means of a tri-plate 28 to a wire rope 30, which in turn is connected to a chain 32. In the illustrated embodiment, each mooring line 12a, 12b, 12c extends over 600 m.

The bridle section 26 is a delta-shaped arrangement made from two separate lines of typically 84 mm chain which are connected to the floating structure 10 beneath the sea level when the floating structure 10 is in situ. The separate lines of the bridle 26 are connected to the floating structure 10 at points 120° apart and each line of the bridle 26 connects to the floating structure 10 at the same point as a line of the adjacent bridle structure 26 by means of a shared bracket 34.

The separate lines of the bridle 26 extend from the floating structure 10 to a common point (the tri-plate 28) in a delta shaped arrangement. The length of the bridle section 26 is determined to give a proper yaw stiffness of the mooring system. In the illustrated example, the bridle section 26 is about 50 m long.

The tri-plate 28 is connected to wire rope 30 which is connected to an anchor chain 32, which is again typically an about 84 mm chain. Each mooring line 12a, 12b, 12c extends from the floating structure 10 to the sea bed in a catenary shape.

The control system of the wind turbine is based on a standard control system that uses pitch-control to maintain rated power output above the rated wind speed of the turbine (which is the lowest wind speed at which maximum power is achieved). The control system is also configured to modify the blade pitch to prevent negative damping above the rated wind speed.

In conventional wind turbines, the pitch of the rotor blades 8 is controlled on the basis of the rotor speed in order to regulate the power output. When operating in winds below the rated wind speed, the blade pitch is kept approximately constant at an angle that provides maximum power output. In contrast, when operating above the rated wind speed, the blade pitch is adjusted in order to produce a constant power output and prevent excessively high power outputs that could damage the generator and/or its associated electronics. This constant power is referred to as the rated power of the wind turbine.

When operating below the rated wind speed, as the blade pitch is kept approximately constant, the thrust acting on the rotor 6 increases with the wind speed (thrust being approximately proportional to the square of the wind speed). This means that motions of the wind turbine structure in the water are stable because the turbine thrust force contributes with positive damping and the buoyant force acts towards an equilibrium position.

When operating above the rated wind speed the blade pitch is adjusted such that the thrust on the rotor 6 decreases with increasing wind speed in order to produce a constant power output. As the wind speed increases, the blade pitch is increased, i.e. made more parallel to the wind direction, which reduces the thrust force. However, a problem associated with adjusting the blade pitch in this way is that it can cause negative damping. This can increase the amplitude of the wind turbine's oscillations in the direction of the wind.

Negative damping in floating wind turbines arises because the turbine structures move as a rigid body in the water, i.e. they may tend to "nod" back and forth. As the wind turbine moves towards the wind, the relative wind speed acting on the wind turbine increases, which tends to increase the rotor torque or speed. Using the pitch control described above for constant power output (i.e. above rated wind speed), in response to an increase in the rotor torque or speed, the blade pitch angle is adjusted to reduce the torque acting on the rotor and, as a result, reduce the thrust and thereby maintain constant power. However, as the thrust force acting on the wind turbine is reduced, the equilibrium position changes and the turbine will pitch forward. This then results in a further change in the relative wind speed and a further adjustment to the blade pitch, making the motions even larger. The opposite applies when the wind turbine is moving away from the wind.

The problem of negative damping associated with the rigid body motion is prevented by providing a control system in which the blade angle adjustment is corrected to account for the velocity fluctuations that occur at the frequency of the rigid cell motions. Two exemplary controllers providing such a function are illustrated in FIGS. 4 and 5—these controllers merely illustrate the basic principles of the control systems and in practice the controllers are more complex.

The control arrangement comprises a standard controller portion 38 which controls the generator in response to changes in the relative wind velocity against the turbine in a conventional manner. Further the controller includes a motion-stabilizing controller portion 44 that is arranged to add an increment to the blade angle of the turbine blade on the basis of the tower velocity to counteract the rigid body motions. This second part of the controller 44 is achieved by means of a stabilizer which determines the blade angle increment based on the tower velocities.

The stabilizer component 44 damps the tower's rigid body motions by controlling the blade angle of the turbine blades so that the motions at that frequency are counteracted. The stabilizer acts by receiving a signal 45 associated with the change in tower velocity from a sensor in the form of an accelerometer or similar and uses a transfer function to turn this into a blade angle increment. This stabilizer 44 is provided with a low pass filter such that it only acts to add a blade angle increment in response to low frequency motions, i.e. those at the frequency of the rigid body motions.

Figure 4:
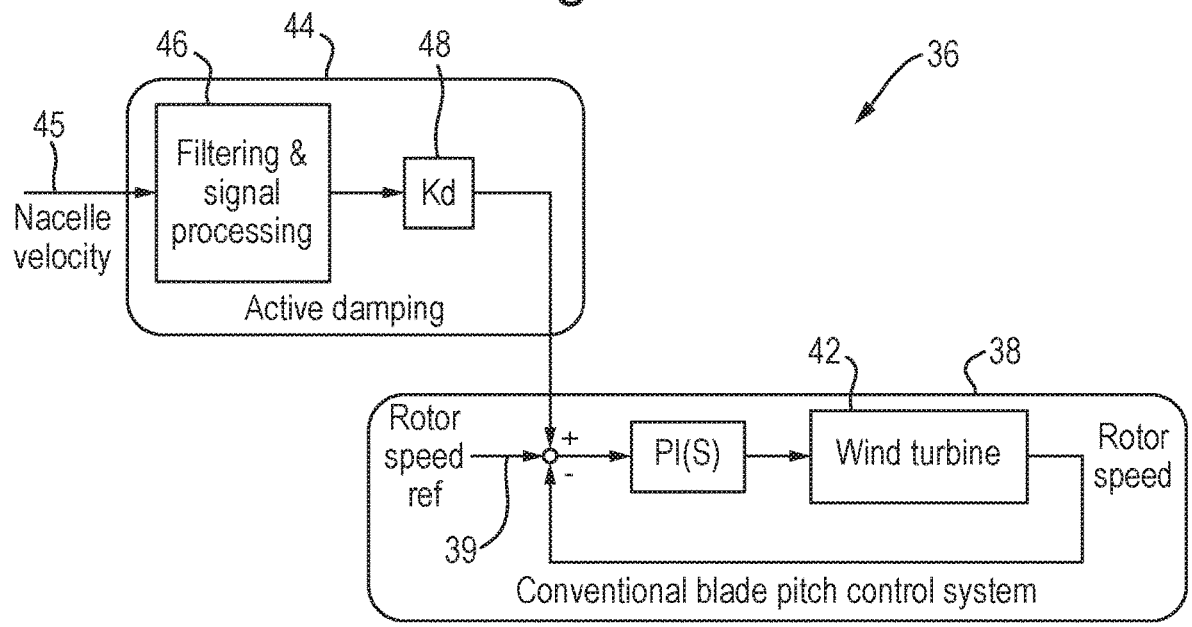
FIG. 4 is a simplified schematic of a first controller for applying blade pitch adjustment to the wind turbine.
Figure 5:
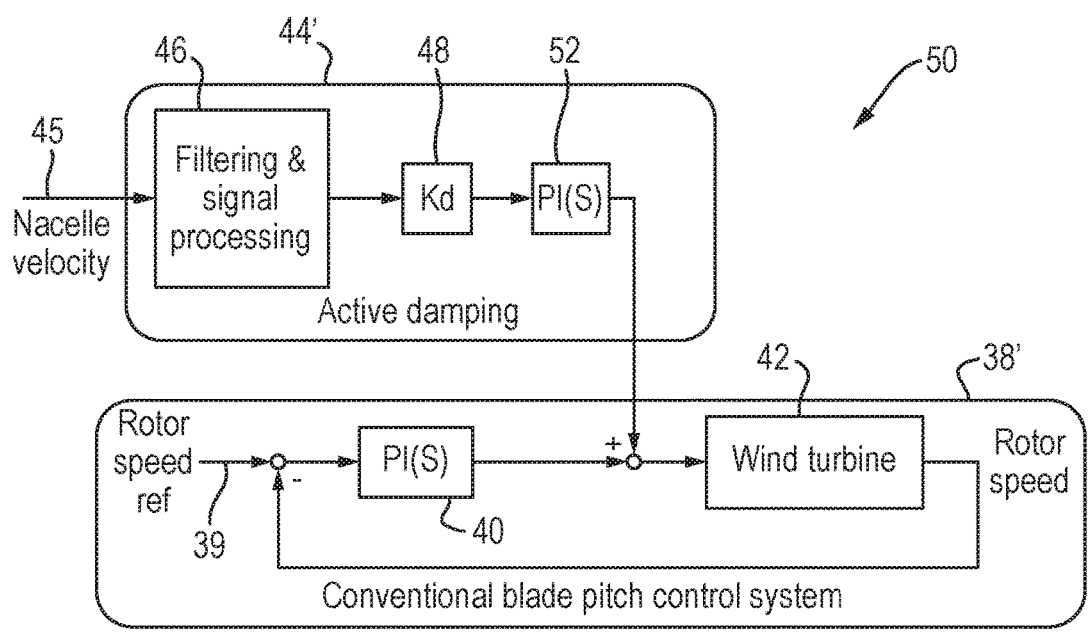
FIG. 5 is a simplified schematic of a second controller for applying blade pitch curtailment to the wind turbine.

A schematic of a first embodiment of a controller 36 is shown in FIG. 4. The lower box 38 shows the conventional blade pitch control system which takes a reference rotor speed 39 (i.e. the rotor speed for rated power output) as an input and includes a PI controller 40 which provides standard blade pitch control to the wind turbine 42 so as to maintain rated power output. The upper box 44 provides the active damping means, which takes a measurement of the nacelle's speed, such as its pitch velocity, as its input and comprises signal processing and low pass filter block 46 and an active damping gain (Kd) 48.

The low pass filter in block 46 is a sharp filter which passes signals with a frequency corresponding to the natural frequency of the tower's free, rigid body oscillations in pitch (typically around 0.03 to 0.04 Hz) and stops signals with a frequency corresponding to the frequency of wave-induced motions (typically around 0.05 to 0.2 Hz). This may be a second or third order Butterworth low pass filter.

The active damping gain (Kd) 48 converts the filtered and processed measurement of the nacelle's horizontal velocity into a rotor speed error due to motions. The PI controller 40 uses a transfer function to convert a rotor speed error which includes the rotor speed error due to motions into an adjustment to the blade pitch. The adjustment to the blade pitch is used in a pitch actuator of the wind turbine 42 to control the blade pitch such that negative damping is not induced.

An alternative controller 50 is shown in FIG. 5, which differs from controller 36 shown in FIG. 4 in that the active damping part 44' includes a separate PI controller 52. In this case the signals from the active and conventional damping controllers 44', 38' are combined after they have been converted into a blade pitch adjustment.

In accordance with the present disclosure, the controller for the wind turbine may be further adapted to modify the aerodynamic rotor thrust force in order to reduce excessive loading on the mooring.

Broadly, the following technique makes use of wind turbine curtailment methods to soften the environmental loading on the mooring system. More particularly, it involves modification of the aerodynamic thrust force curve of the wind turbine by adding an offset blade pitch angle to the conventional wind turbine control system described above based on analysis of static and dynamic nonlinearities of the mooring system in response to the environmental loading.

Two complementary controller designs have been developed to soften the environmental loading on the mooring system:

1. A controller calculating a blade pitch offset angle on the basis of measured wind direction and the degree of pitching motion to reduce loads in the mooring system in situations with unfavorable wind loading.

2. A controller calculating a blade pitch offset based on a measured GPS position of the turbine to reduce the loads in the mooring system in situations with large current speeds.

Controller 1

In determining the controller designs, a reference controller was first developed that calculated a blade pitch offset angle on the basis of actual levels of fatigue damage in the most damaged portion of the mooring system. In simulations, this data can be easily obtained from computer modelling software.

However, such a controller is not possible in practice because actual rates of fatigue damage in the mooring system cannot be readily measured.

During the analysis, simulations of 88 load cases were examined that were based on the expected met-ocean conditions for the site of the turbine. For the example turbine, these 88 load cases produced fatigue damage values (D) of between 0.1% per year and 12% per year. Values of below $D_0$=0.8% per year were considered acceptable (equivalent to a life of 125 years) and hence required a zero blade pitch offset level. These included 24 out of the 88 load cases.

The blade pitch offset angle $\beta_{offset}$ was selected to be $\beta_{offset,MEAN}$=4° at the mean damage level, $D_{MEAN}$=1.2%, of all 88 load cases, with a linear curve from Do through $D_{MEAN}$, until reaching a maximum blade pitch offset angle, $\beta_{offset,MAX}$=8°.

The above can be formulated as:

$$\beta_{offset}(D) = \begin{cases} 0, \text{ for } D < D_0 \\ 4\dfrac{D - D_0}{D_{MEAN} - D_0}, \text{ for } D_0 < D < D_{MAX} \\ \beta_{offset,MAX}, \text{ for } D > D_{MAX} = 2D_{MEAN} - D_0 \end{cases}$$

Controller 2

Next, a controller was developed for calculation of blade pitch offset angle on the basis of wind direction, aw, and the standard deviation of the pitch motion, $\eta_{STD}$. The zero blade pitch offset level was set to a standard deviation of the pitch motion $\eta_{STD\_0}$=0.4°, below which 24 of the load cases fell.

Figure 6:
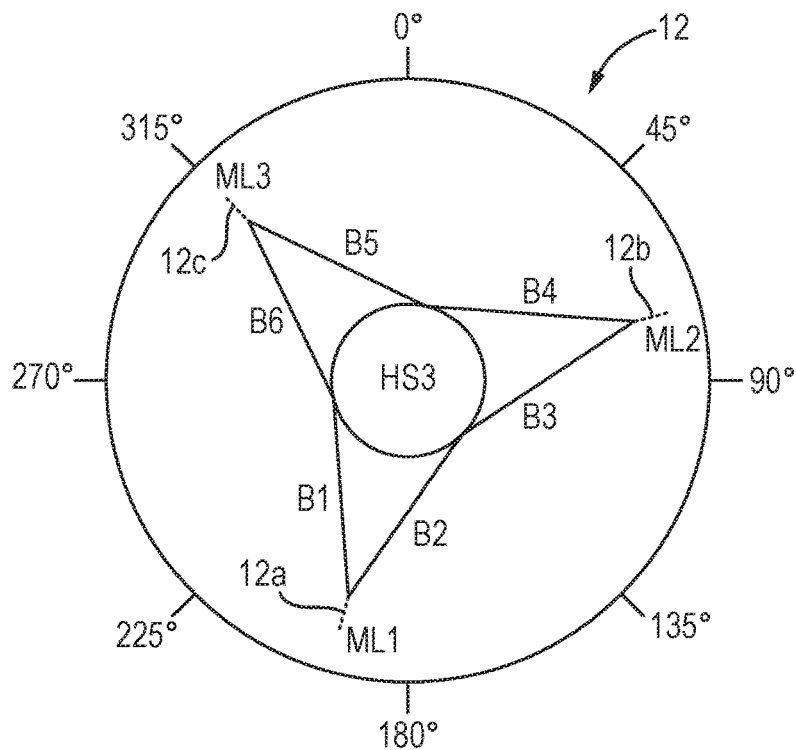
FIG. 6 is a plan view of the wind turbine showing the orientation of an exemplary mooring structure.

The controller is configured to apply a linear blade pitch offset angle strategy $\beta_{offset}(\alpha_W)$ with variation with wind direction $\alpha_W$. The function $\beta_{offset}(\alpha_W)$ varies linearly with wind direction, $\alpha_W$, from with a minimum linear wind direction offset angle, $\beta_{offset,DIR\_MIN}$=0°, to a maximum linear wind direction offset angle, $\beta_{offset,DIR\_MAX}$=4°. The maximum offset is used when the wind is approaching directly over a single mooring line, and the minimum offset is used when the wind approaching directly between two mooring lines. That is to say, the offset is maximum when all of the wind load is applied to a single mooring line, as minimum when it is split between two mooring lines. For example, FIG. 6 illustrates a turbine mooring system 12 having three mooring lines 12a, 12b, 12c. The function $\beta_{offset}(\alpha_W)$ has its first maximum when the wind direction is going towards 15° and first minimum when the wind direction is going towards 75°.

An additional linear blade pitch offset angle strategy is also applied with variation with the standard deviation of the tower pitch motion $\eta_{SSTD}$ and was applied for $\eta_{5STD} > \eta_{5STD\_0} = 0.4°$. The blade pitch offset angle $\beta_{offset}$ was selected to be $\beta_{offset\_2} = 5°$ at double the reference standard deviation of the tower pitch motion $2\eta_{5STD\_0}$, with a linear curve from $\eta_{5STD\_0}$, until reaching the maximum blade pitch offset angle.

The maximum blade pitch offset angle was again selected to be $\beta_{offset\_MAX} = 8°$, taking into account the combined offset due to wind direction and tower pitch motion. For example, the maximum could be reached either by a very high pitch deviation or by a lower pitch deviation but in an unfavorable wind direction.

The above can be formulated as:

$$\beta_{offset}(\alpha_W, \eta_{5STD}) = \begin{cases} 0, \text{ for } \eta_{5STD} < 0.4 \\ \beta_{offset}(\alpha_W) + 5\frac{\eta_{5STD} - \eta_{5STD\_0}}{\eta_{5STD\_0}} \text{ for } \beta_{offset}(\alpha_W) + 5\frac{\eta_{5STD} - \eta_{5STD\_0}}{\eta_{5STD\_0}} <= \beta_{offset,MAX} \\ \beta_{offset,MAX}, \text{ for } \beta_{offset}(\alpha_W) + 5\frac{\eta_{5STD} - \eta_{5STD\_0}}{\eta_{5STD\_0}} > \beta_{offset,MAX} \end{cases}$$

Controller 3

The third procedure used for calculation of blade pitch offset angle uses the basis of wind direction and the standard deviation of the angular motion projected onto the heaviest loaded mooring line.

The zero blade pitch offset level was calculated at a standard deviation of 0.35°. Again, this level corresponds to the level below which 24 of the load cases fell.

As above, a linear blade pitch offset angle strategy $\beta_{offset}(\alpha_W)$ with variation with wind direction $\alpha_W$ was used, the function $\beta_{offset}(\alpha_W)$ again varying linearly with wind direction, $\alpha_W$, from with a minimum linear wind direction offset angle, $\beta_{offset,DIR\_MIN} = 0°$, to a maximum linear wind direction offset angle, $\beta_{offset,DIR\_MAX} = 4°$.

Then, an additional linear blade pitch offset angle strategy with variation with the angular motion projected onto the heaviest loaded mooring $\eta_{PTSD}$ was applied for $\eta_{PSTD} > \eta_{PSTD\_0} = 0.35°$. The blade pitch offset angle $\beta_{offset}$ was again selected to be $\beta_{offset\_2} = 5°$ at double the reference standard deviation of the tower pitch motion $2\eta_{PTSD\_0}$, with a linear curve from $\eta_{5STD\_0}$, until reaching the maximum blade pitch offset angle.

Again, a maximum blade pitch offset angle was selected to be $\beta_{offset\_MAX} = 8°$, taking into account the combined offset due to wind direction and tower pitch motion.

This can be formulated as:

$$\beta_{offset}(\alpha_W, \eta_{P\_STD}) = \begin{cases} 0, \text{ for } \eta_{PSTD} < 0.35 \\ \beta_{offset}(\alpha_W) + 5\frac{\eta_{P\_STD} - \eta_{P\_STD\_0}}{\eta_{P\_STD\_0}} \text{ for } \beta_{offset}(\alpha_W) + 5\frac{\eta_{P\_STD} - \eta_{P\_STD\_0}}{\eta_{P\_STD\_0}} <= \beta_{offset,MAX} \\ \beta_{offset,MAX}, \text{ for } \beta_{offset}(\alpha_W) + 5\frac{\eta_{P\_STD} - \eta_{P\_STD\_0}}{\eta_{P\_STD\_0}} > \beta_{offset,MAX} \end{cases}$$

Overall, the second and third controller strategies were found to have good agreement with the first reference controller strategy, in the sense that large, medium and small offset blade pitch angles often occur for the same load cases.

Controller 4

A fourth controller accounts for variations in mooring loading due to currents and applies a blade pitch offset based on a measured GPS position of the turbine.

Figure 7:
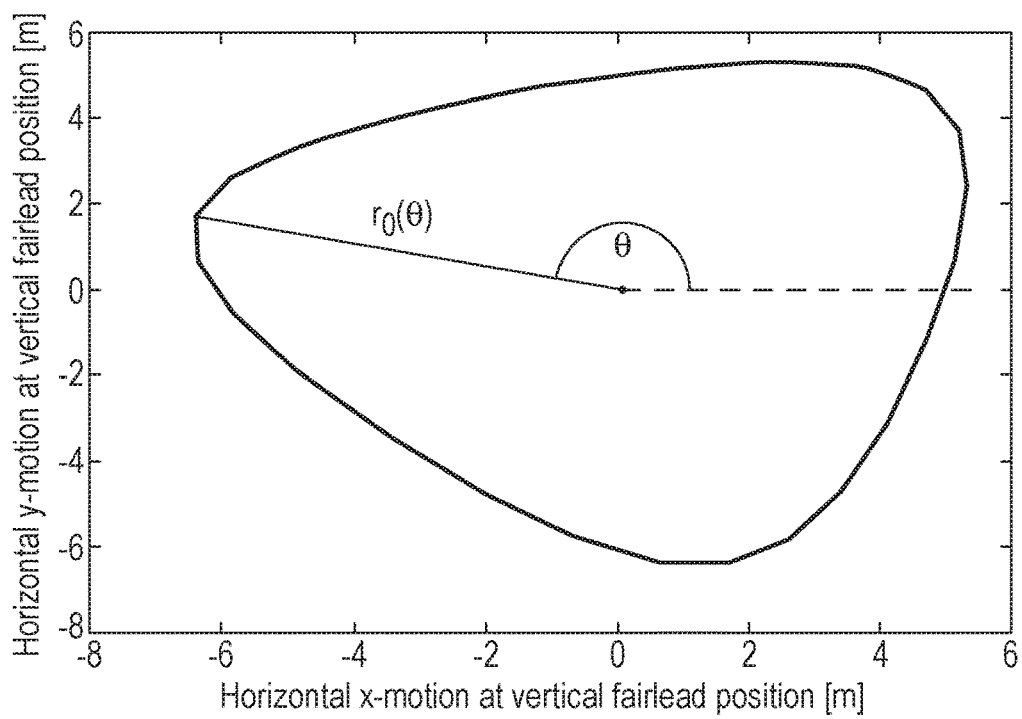
FIG. 7 is a graph showing a reference radius around the wind turbine corresponding to displacements placing an acceptable strain on the moorings.

A horizontal reference radius $r_0(\theta)$ is defined from the vertical fairlead level (the level where the moorings attach to the tower) in the center of the tower on the basis of the given direction $\theta$ of the platform offset. The horizontal reference envelope $r_0(\theta)$ is the position of the tower at rated aerodynamic thrust force with a zero current speed. An exemplary envelope is shown in FIG. 7. Motion outside of this radius is undesirable and the controller is designed to counter such motion by reducing the aerodynamic rotor thrust force by application of an additional blade pitch offset angle $\beta_{offsetC}$.

In the following equations, $x_{FL}$ and $y_{FL}$ give the horizontal position of the center of the tower at the vertical fairlead position, which can be calculated on basis of the GPS measurement on the platform and MRU (motion reference unit) measurements of the pitch and roll motions in the water line referenced to the substructure:

$x_{FL} = x_{GPS} - h\eta_5$ $y_{FL} = y_{GPS} + h\eta_4$, where h is the vertical height from the platform level to the fairlead level, $x_{GPS}$ and $y_{GPS}$ are the GPS measured positions at the platform level, and $\eta_4$ and $\eta_5$ are the roll and pitch motions in the water line referenced to the substructure, measured by the MRU.

Consequently, the calculated horizontal radial position m of the center of the tower at the vertical fairlead position is determined by:

$r_m = \sqrt{x_{FL}^2 + y_{FL}^2}$

Due to the slowly varying nature of the current speed, only slowly varying components of $r_m$ are of interest for current control. A third order Butterworth filter can be used for the filtering:

$$r_{mf} = \frac{\omega_c^3}{s^3 + 2\omega_c s^2 + 2\omega_c^2 s + \omega_c^3} r_m,$$

where s is the Laplace variable, and $\omega_c$ is the filter frequency which should be selected to a sufficiently low value, e.g. a period of ten minutes:

$$\omega_c = \frac{2\pi}{600}$$

The following PI controller procedure is proposed:

$\beta_{offsetC} = K_P(\theta)\Delta_P + K_1(\theta)\Delta_1$, where $K_P(\theta)$ and $K_1(\theta)$ are the proportional and integral action controller gains that generally could vary with the wind direction $\theta$, and $$\Delta_P = \begin{cases} r_{mf} - r_0(\theta), & \text{for } r_{mf} - r_0(0) > 0 \\ 0, & \text{for } r_{mf} - r_0(0) \leq 0 \end{cases}$$

$$\Delta_I = \begin{cases} \int r_{mf} - r_0(\theta) d\tau, & \text{for } r_{mf} - r_0(0) > 0 \\ 0, & \text{for } r_{mf} - r_0(0) \leq 0 \end{cases}$$

Furthermore, the integral in equation $\Delta_1$ must be reset to 0 whenever $r_{mf}-r_0(\theta) \leq 0$. Ideally this reset is carried out in a soft manner so that the integrator value decays to zero over a predefined time, for example 200 seconds.

Control 5

An alternative to the fourth controller scheme is application of a nonlinear control action on large deviations from the reference radius $r_0$ instead of the integral control action, by application of and/or combination of a polynomial or exponential function, or similar. One example is the nonlinear controller:

$$\beta_{offsetC} = K_{P1}(\theta)\Delta_P + K_{P2}(\theta)\Delta_P^2$$

CONCLUSION

The two complementary controller designs presented, i.e. controller 2 or controller 3 in combination with controller 4 or controller 5, may soften the effect of environmental loading on the mooring system.

Figure 8:
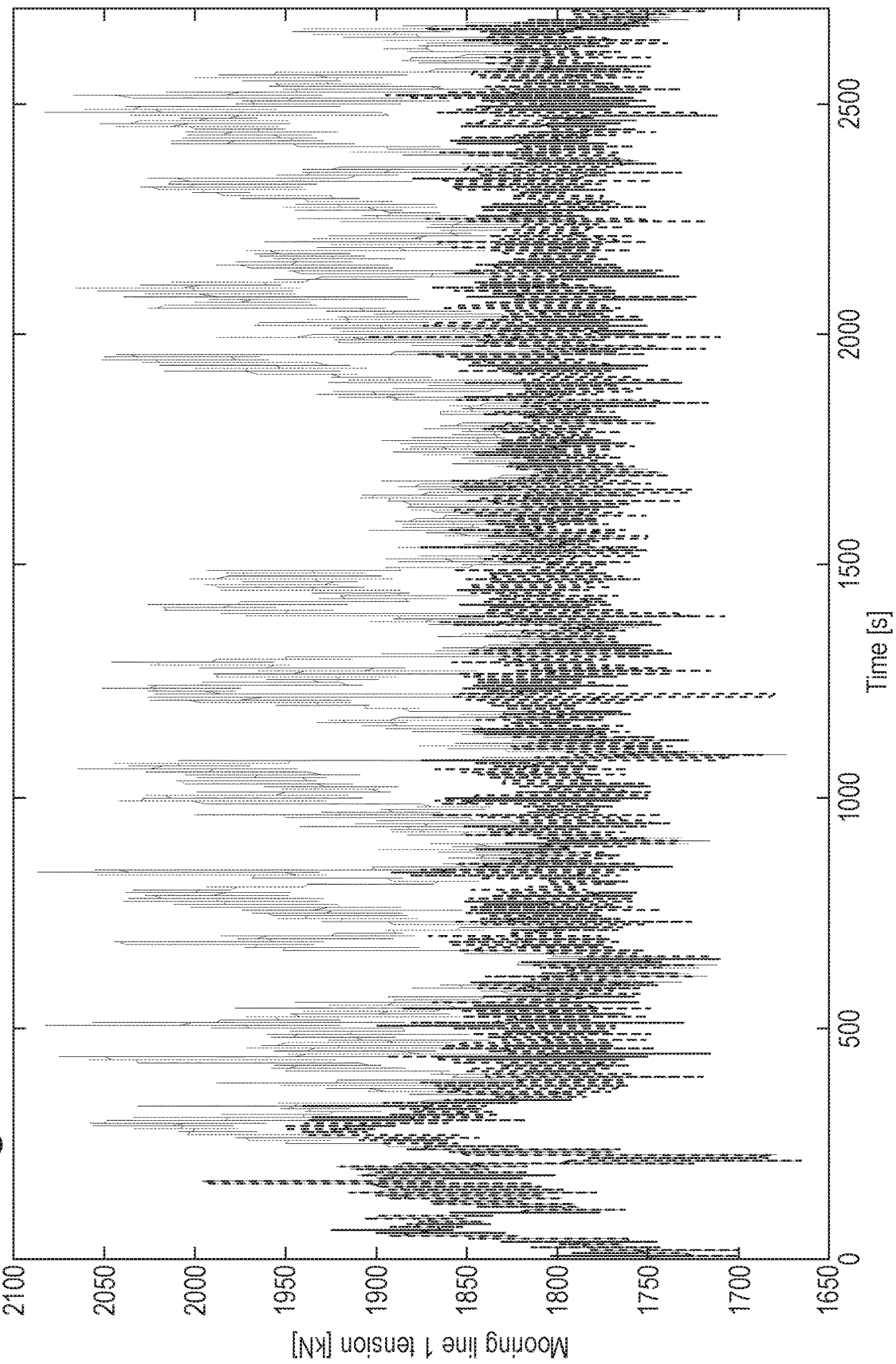
FIG. 8 is a graph showing the effects of current-based blade pitch control on the tension in the most heavily loaded mooring line.

In a full FLS (fatigue load state) simulation study with these strategies, the controllers reduced the loads in the mooring system at the cost of somewhat reduced power production. On average approximately 10% increase in the mooring line life time is achieved at a corresponding cost of 1% reduced production. Data from the simulation is shown in FIG. 8. As can be seen from FIG. 8, peaks in the mooring line tension that might otherwise significantly decrease the fatigue lifetime of the mooring system are reduced. However, there is only a minor reduction in power production. For the particular simulation shown in FIG. 8, the damage in the mooring line was reduced by 56% at the cost of a 7.6% reduction in power.

The controllers could be used during the mooring design in three different ways:

1. The controllers could be accounted for in the mooring design analyses of the mooring system.

2. The controllers could be used to decrease the safety factors required on the basis that uncertainties in the met-ocean design basis can be handled by the controller in case the environmental loading is worse than forecasted.

3, The controllers and their settings may be mobilized during the operational phase of the turbines. The settings will be based upon real, measured mooring line tensions. Thereby uncertainties related to fatigue life of the mooring lines may be significantly reduced as compared to the estimates used in design.

A further method for rotor thrust force assisted mooring design is the application of individual blade pitch control to counter yaw motions of the floating wind turbine in order to reduce or remove the yaw-stiffness requirements of the mooring system. Such a method is described in WO 2014/096419, the contents of which is incorporated herein by reference. The technique described therein may be incorporated in combination with the above described technique.

The individual effects of these techniques have been found to increase when they are applied together.

Whilst the above techniques curtail the floating wind turbine by applying a blade pitch offset, it will be appreciated that any suitable form of curtailment may be used. For example, in one embodiment, the generator torque may be increased to curtail the rotor speed. In another embodiment, the controller may decrease the target rated power output or rated wind speed used in other aspects of the control of the blade pitch so as to apply rated wind curtailment control at a lower wind speed than would be applied otherwise.

Furthermore, whilst some of the above control systems include step functions, it will be appreciated that, in a practical implementation in the wind turbine system, the controller may apply smoothing or filtering to these controllers.

Yet further, whilst the controllers are illustrated using simple linear functions, in practice the controller may be implemented using more complex, non-linear control functions, such as incorporating polynomial functions and/or exponential functions.

The invention claimed is:

1. A method of controlling a turbine of a floating wind turbine structure to reduce fatigue of moorings of the floating wind turbine structure, the method comprising:
   determining a motion of the floating wind turbine structure and a wind direction at the floating wind turbine structure; and
   curtailing the turbine based on the determined motion of the floating wind turbine structure and the determined wind direction at the floating wind turbine structure relative to directions in which the moorings extend away from the floating wind turbine structure,
   wherein curtailing the turbine comprises reducing a power output of the turbine, and
   wherein a wind-direction-based component of the curtailment has a higher value when wind approaches directly over one of the moorings and a lower value when wind approaches directly between two of the moorings.

2. The method according to claim 1, wherein the motion is a pitch motion and the curtailment is based on variability of the pitch motion.

3. The method according to claim 1, wherein the motion is a pitch motion and at least one of a pitch-motion-based component of the curtailment or a wind-direction-based component of the curtailment is constant below a threshold level of the pitch motion.

4. The method according to claim 1, wherein the motion is a pitch motion and the curtailment includes a pitch-motion-based component that increases with the pitch motion.

5. The method according to claim 1, wherein the curtailment comprises applying a blade pitch offset to one or more blades of the turbine so as to reduce an aerodynamic rotor thrust force on the floating wind turbine structure.

6. The method according to claim 5, wherein the motion is a pitch motion and the blade pitch offset is determined at least in part based on a following equation:

$$\beta_{offset}(\alpha_W, \eta_{STD}) = \beta_{wind\_offset}(\alpha_W) + \beta_{pitch\_offset}(\eta_{STD})$$

where $\beta_{offset}$ is the blade pitch offset, $\alpha_W$ is the wind direction, $\eta_{STD}$ is either a standard deviation of the pitch motion over a predetermined period of time or a value derived therefrom, $\beta_{pitch\_offset}$ is an offset based on rpm, and $\beta_{wind\_offset}$ is an offset based on the wind direction.

7. The method according to claim 6, wherein the offset based on the wind direction is determined at least in part based on a following equation:

$$\beta_{wind\_offset}(\alpha_W) = \beta_2 \left| 1 - 2\frac{(\alpha_W + \alpha_0) \bmod \theta}{\theta} \right|,$$

where $\beta_2$ is a constant, $\alpha_0$ is a constant, and $\theta$ is an angular distance between adjacent moorings.

8. The method according to claim 6, wherein the offset based on $\eta_{STD}$ is determined at least in part based on a following equation:

$$\beta_{pitch\_offset}(\eta_{STD}) = \beta_1 \frac{\eta_{STD} - \eta_{STD\_0}}{\eta_{STD\_0}},$$

where $\eta_{STD\_0}$ is a constant, and $\beta_1$ is a constant.

9. The method according to claim 6, wherein $\beta_{offset}(\alpha_W, \eta_{STD})$ is set to zero for values of $\eta_{STD} < \eta_{STD\_0}$.

10. The method according to claim 1, wherein the curtailment comprises increasing a torque of a generator of the turbine so as to reduce an aerodynamic rotor thrust force of the floating wind turbine structure.

11. The method according to claim 1, further comprising curtailing the turbine based on a position of the floating wind turbine structure relative to a reference position.

12. The method according to claim 11, wherein the position of the floating wind turbine structure is determined using a satellite-based positioning system.

13. The method according to claim 11, wherein the position of the floating wind turbine structure is determined by considering tension in the moorings.

14. The method according to claim 11, wherein the curtailment based on the position of the floating wind turbine structure is based on a frequency-filtered position of the floating wind turbine structure, the frequency-filtered position having been low-pass filtered.

15. The method according to claim 11, wherein the curtailment based on the position of the floating wind turbine structure comprises a position-based component that is applied only when the position of the floating wind turbine structure is greater than a predetermined threshold distance from the reference position.

16. The method according to claim 15, wherein the position-based component comprises at least a component that is proportional to a distance of the floating wind turbine structure from the reference position or a value derived from the distance of the floating wind turbine structure from the reference position.

17. The method according to claim 15, wherein the position-based component comprises at least a component that is proportional to an integral of a distance of the floating wind turbine structure beyond the predetermined threshold distance or a value derived from the distance of the floating wind turbine structure beyond the predetermined threshold distance.

18. The method according to claim 15, wherein the position-based component comprises at least a component that is proportional to a polynomial or exponential function of a distance of the floating wind turbine structure beyond the predetermined threshold distance or a value derived from the distance of the floating wind turbine structure beyond the predetermined threshold distance.

19. The method according to claim 1, further comprising curtailing the turbine so as to produce no more than a rated power output at wind speeds above a rated wind speed of the turbine.

20. The method according to claim 19, wherein the curtailing above the rated wind speed comprises controlling the curtailment so as to suppress rigid body motions of the floating wind turbine structure in a pitch direction at a resonant frequency of the floating wind turbine structure.

21. The method according to claim 1, wherein the moorings comprise catenary mooring lines extending away from the floating wind turbine structure.

22. The method according to claim 1, wherein the floating wind turbine structure has a floating spar configuration.

23. A turbine for a floating wind turbine structure comprising a controller configured to control the turbine in accordance with the method of claim 1.

24. A non-transitory computer-readable medium comprising computer-readable instructions that, when executed, cause a controller to control a turbine of a floating wind turbine structure in accordance with the method of claim 1.

* * * * *